(12) United States Patent
Matsunaga et al.

(10) Patent No.: US 8,906,288 B2
(45) Date of Patent: Dec. 9, 2014

(54) PROCESS FOR PRODUCING SIC FIBER-BONDED CERAMICS

(75) Inventors: Kenji Matsunaga, Yamaguchi (JP); Shinji Kajii, Yamaguchi (JP); Tsutomu Kodama, Yamaguchi (JP)

(73) Assignee: Ube Industries, Ltd. (JP)

( * ) Notice: Subject to any disclaimer, the term of this patent is extended or adjusted under 35 U.S.C. 154(b) by 798 days.

(21) Appl. No.: 13/120,000

(22) PCT Filed: Sep. 17, 2009

(86) PCT No.: PCT/JP2009/066281
§ 371 (c)(1), (2), (4) Date: Apr. 19, 2011

(87) PCT Pub. No.: WO2010/035692
PCT Pub. Date: Apr. 1, 2010

(65) Prior Publication Data
US 2011/0187030 A1  Aug. 4, 2011

(30) Foreign Application Priority Data

Sep. 24, 2008  (JP) .................................. 2008-244078

(51) Int. Cl.
| | |
|---|---|
| *C04B 35/565* | (2006.01) |
| *C04B 35/645* | (2006.01) |
| *C04B 35/626* | (2006.01) |
| *C04B 35/56* | (2006.01) |
| *C04B 35/575* | (2006.01) |
| *C04B 35/622* | (2006.01) |
| *D01F 9/14* | (2006.01) |

(52) U.S. Cl.
CPC ......... *C04B 35/6269* (2013.01); *C04B 35/5603* (2013.01); *C04B 35/5755* (2013.01);

(Continued)

(58) Field of Classification Search
CPC .................... C04B 35/5603; C04B 35/62281; C04B 35/5755; C04B 2235/483; C04B 2235/652; C04B 2235/79
USPC .......................................................... 264/604
See application file for complete search history.

(56) References Cited

U.S. PATENT DOCUMENTS 4,381,931 A * 5/1983 Hunold et al. ................. 65/17.5
4,983,339 A * 1/1991 Boncoeur et al. ............. 264/604

(Continued)

FOREIGN PATENT DOCUMENTS

| JP | 2002-356381 | 12/2002 |
|---|---|---|
| JP | 2004-131365 | 4/2004 |
| JP | 2008-150271 | 7/2008 |

*Primary Examiner* — Erin Snelting
(74) *Attorney, Agent, or Firm* — Clark Hill PLC

(57) ABSTRACT

Provided is a process for producing dense SiC fiber-bonded ceramics excellent in heat resistance and having a shape hard to form by hot pressing such as an elongated shape. The process for producing SiC fiber-bonded ceramics composed of: inorganic fiber made of SiC; and interfacial layers mainly made of carbon includes vacuum-sealing a preform, prepared by forming specific silicon carbide-based inorganic fiber into a certain shape, into a capsule and hot-isostatic-pressing the preform. The process is characterized in that the ratio of the number of carbon atoms to the number of silicon atoms in the preform is 1.02 to 1.20, and before the hot isostatic pressing, the preform is heated in an inert gas atmosphere or a reducing gas atmosphere at a temperature of 1200° C. to 1800° C. to adjust the oxygen content in the inorganic fiber to 6.0% by weight or lower, and then the hot isostatic pressing is carried out.

6 Claims, 2 Drawing Sheets

(52) U.S. Cl.
CPC ............ *C04B 35/62281* (2013.01); *D01F 9/14* (2013.01); *C04B 2235/3205* (2013.01); *C04B 2235/3206* (2013.01); *C04B 2235/3217* (2013.01); *C04B 2235/3225* (2013.01); *C04B 2235/3229* (2013.01); *C04B 2235/3409* (2013.01); *C04B 2235/3895* (2013.01); *C04B 2235/44* (2013.01); *C04B 2235/441* (2013.01); *C04B 2235/483* (2013.01); *C04B 2235/5244* (2013.01); *C04B 2235/652* (2013.01); *C04B 2235/656* (2013.01); *C04B 2235/77* (2013.01); *C04B 2235/79* (2013.01)
USPC ............................ 264/604; 264/640; 264/682

(56) References Cited

U.S. PATENT DOCUMENTS

| | | | | |
|---|---|---|---|---|
| 6,001,756 | A | * | 12/1999 | Takahashi et al. ............... 501/90 |
| 6,187,256 | B1 | * | 2/2001 | Aslan et al. .................... 264/666 |
| 6,214,755 | B1 | * | 4/2001 | Otsuki et al. ..................... 501/90 |
| 7,150,850 | B2 | * | 12/2006 | Odaka ............................ 264/682 |
| 2004/0029704 | A1 | * | 2/2004 | Kajii et al. ....................... 501/88 |
| 2005/0001361 | A1 | * | 1/2005 | Kohyama et al. ............. 264/500 |
| 2011/0028301 | A1 | * | 2/2011 | Vargas-Gonzalez et al. ... 501/90 |
| 2013/0323152 | A1 | * | 12/2013 | Aoki et al. ..................... 423/345 |

* cited by examiner

PROCESS FOR PRODUCING SIC FIBER-BONDED CERAMICS

TECHNICAL FIELD

The present invention relates to a process for producing dense SiC fiber-bonded ceramics having excellent heat resistance. Particularly, the present invention relates to a process for producing SiC fiber-bonded ceramics usable as a dense component required to have thermal shock resistance and high-temperature properties, such as a combustor component, a heat exchanger, etc.

BACKGROUND ART

In the aerospace field and energy and environmental field, for the purposes of improving efficiency and performance, attention has been paid to SiC-based heat-resistant materials that are excellent in oxidation resistance, remain stable for a long time under a high temperature, and have corrosion resistance, high heat conductivity, small thermal expansion property, and low specific densities. Application of such SiC-based materials to a combustor component, a heat exchanger, etc., which are required to be made from a dense material, is also being considered. Representative SiC-based materials include monolithic SiC ceramics, SiC fiber-reinforced SiC composite materials (hereinafter referred to as SiC/SiC), and SiC fiber-bonded ceramics.

Monolithic SiC ceramics are hard and dense and have excellent heat resistance. Therefore, they are used for a sliding member such as a ball bearing, a sliding bearing, etc. in a high-temperature region and a cryogenic region in which a lubricant cannot be used. However, monolithic SiC ceramics lack reliability because they are brittle, being sensitive to minute defects.

On the other hand, SiC/SiC is a material that overcomes the brittleness of monolithic SiC ceramics with a toughening mechanism such as fiber bridging, crack deflection, etc. SiC/SiC is produced mainly by CVI (Chemical Vapor Infiltration) method, PIP (Polymer Infiltration and Pyrolysis) method, and MI (Melt Infiltration) method. However, since all of these methods leave pores in the material, the material needs to be coated with a dense surface layer in order to be applied to a component required to have denseness. Hence, as a process for producing dense SiC/SiC, Patent Document 1 discloses a process for producing a high-density SiC fiber-reinforced SiC composite material by hot pressing. This material is produced by preparing a slurry containing dispersed SiC fine powder and sintering aid, making a preform by impregnating the slurry into SiC fiber coated with one or two or more of carbon, boron nitride, and silicon carbide, and hot-pressing the preform at a sintering temperature of 1600 to 1800° C. and at a pressure of 10 MPa or higher.

Meanwhile, SiC fiber-bonded ceramics are produced by hot-pressing only amorphous Si-M-C-O fiber (M being at least one or more metal element among group IIA, group IIIA, and group IIIB metal elements). In the process for producing SiC fiber-bonded ceramics, the amorphous fiber structurally changes to polycrystalline SiC fiber and at the same time to a closest-packed hexagonal column under a high temperature and a high pressure while generating gas. In the process of the structural changes of the fiber, excess carbon in the amorphous fiber is eliminated onto the fiber surface and formed into a layer structure on the fiber surface. Since this carbon layer on the fiber surface functions as a sliding layer that deflects crack propagation, SiC fiber-bonded ceramics exhibit excellent fracture toughness. From these facts, SiC fiber-bonded ceramics are a material that overcomes the brittleness of monolithic ceramics and the insufficient denseness of SiC/SiC. Particularly, Patent Document 2 discloses a process for hot-pressing a material via a pressure-transmitting medium made of inorganic powder in order to produce SiC fiber-bonded ceramics having a complex shape.

Patent Document 3 discloses a process for producing a bar-shaped or tubular fiber-reinforced ceramics composite material by hot isostatic pressing. According to patent Document 3, the process for producing a fiber-reinforced ceramics composite material includes making a preform by forming prepreg sheet made of inorganic fiber and ceramics powder or forming inorganic fiber made of an inner layer and a surface layer into a certain shape, sealing the preform in a glass capsule, and hot-isostatic-pressing the encapsulated preform. In this process, there is a step of covering the surface of the preform with a substance that remains stable by reacting with none of the preform and the glass and does not allow permeation of the glass thereinto. The viscosity of the glass capsule during hot isostatic pressing is $10^3$ to $10^{7.5}$ P. The amount of glass used in the hot isostatic pressing process is adjusted in a way to release any residual tensile stress that is generated on the product due to breakage of the glass of the glass capsule covering the surface of that substance during a cooling process. The inorganic fiber recited in claim 1 of Patent Document 3 is thermally very stable and can be considered to keep the structure before the hot isostatic pressing process even after the process. The inorganic fiber made of an inner layer and a surface layer recited in claim 2 of Patent Document 3 also does not have a large structural change after the hot isostatic pressing process, though with a slight structural change. In this inorganic fiber, the inner layer is made of (a) an amorphous material substantially consisting of Si, M, C, and O (where M being Ti or Zr), (b) an assembly of crystalline superfine particle substantially consisting of at least one or more of β-SiC, MC, a solid solution of β-SiC and MC, and MC1-X, and C; and an amorphous material consisting of $SiO_2$ and $MO_2$ (where X being a number not less than 0 and less than 1), or (c) a mixture of the amorphous material of (a) and the assembly of (b). The surface layer is made of (d) an amorphous material substantially consisting of Si, M, and O, (e) a crystalline assembly consisting of crystalline $SiO_2$ and $MO_2$, or (f) a mixture of the amorphous material of (d) and the crystalline assembly of (e). That is, neither of these inorganic fibers generates a large amount of gas before or after hot isostatic pressing.

CONVENTIONAL ART DOCUMENT

Patent Document

Patent Document 1: JP2002-356381A
Patent Document 2: JP2004-131365A
Patent Document 3: JP2008-150271A

DISCLOSURE OF INVENTION

Problem to be Solved by the Invention

However, in FIG. 1 of Patent Document 1, some pores are recognized between fiber components even in a sample using β-SiC particle having a small particle size, though not so many as when the sample is prepared by the CVI method, the PIP method, and the MI method described above. Furthermore, the process of Patent Document 1 can form a plate-like product easily because it uses hot pressing. However, this hot pressing method can apply a pressure only in limited directions when forming an elongated tubular product and cannot obtain a product having the intended shape.

The process of Patent Document 2 using a pressure-transmitting medium made of inorganic powder is effective for forming a shape having a press height that is not greatly different from the press area. However, when forming an elongated tubular product having a press height that is greatly different from the press area, the inorganic powder serving as the pressure-transmitting medium becomes solidified near the top region of the product and cannot transmit the pressure sufficiently to the bottom region apart from the press surface. Therefore, this process cannot form SiC fiber-bonded ceramics having an elongated shape.

Patent Document 3 describes a fiber-reinforced ceramics compound material made by hot isostatic pressing that can form an elongated shape. However, if this process is used to produce SiC fiber-bonded ceramics that are made of inorganic fiber of which structure changes during pressing by generating a large amount of gas, the gas generated from the inorganic fiber during the hot isostatic pressing process damages the glass capsule, or the large amount of gas remains in the fiber, resulting in SiC fiber-bonded ceramics that are not dense.

Hence, the present invention aims for providing a process for producing SiC fiber-bonded ceramics having denseness, excellent heat resistance, and a shape such as an elongated shape that is hard to form by hot pressing.

Means for Solving the Problem

In order to achieve the above object, the inventors herein have conducted earnest researches, and as a result, found a process for realizing hot isostatic pressing of SiC fiber-bonded ceramics, which has been difficult due to influence of gas emitted during pressing, and which has been realized by heating silicon carbide-based inorganic fiber prepared by melt-spinning, curing, and firing a metal element-containing organosilicon polymer, in order to strictly control the ratio of the number of carbon atoms to the number of silicon atoms (number of C atoms/number of Si atoms) in the fiber to a range of 1.02 to 1.20, and the oxygen content in the fiber to 6.0% by mass or lower. This has enabled production of an elongated shape which has been difficult to produce. That is, a process for producing SiC fiber-bonded ceramics composed of: inorganic fiber made of SiC; and interfacial layers mainly made of carbon includes: a step of adding a compound containing at least one or more metal element among group IIA, group IIIA, and group IIIB metal elements to polysilane or its heating reaction product and then heat-reacting them in an inert gas to obtain a metal element-containing organosilicon polymer; a step of melt-spinning, curing, and firing the metal element-containing organosilicon polymer to produce silicon carbide-based inorganic fiber; a step of forming the silicon carbide-based inorganic fiber into a certain state to obtain a preform; and a step of vacuum-sealing the preform into a capsule and hot-isostatic-pressing the preform to obtain SiC fiber-bonded ceramics. The process is characterized in that the ratio of the number of carbon atoms to the number of silicon atoms (number of C atoms/number of Si atoms) in the preform is 1.02 to 1.20, and before the hot isostatic pressing, the preform is heated in an inert gas atmosphere or a reducing gas atmosphere at a temperature of 1200° C. to 1800° C. to adjust the oxygen content in the inorganic fiber to 6.0% by mass or lower, and then the hot isostatic pressing is carried out.

The process for producing the SiC fiber-bonded ceramics according to the present invention is characterized in that the SiC fiber-bonded ceramics are tubular, and the preform is formed by winding a fabric sheet obtained by weaving the silicon carbide-based inorganic fiber around a heat-resistant core cylinder.

The process for producing the SiC fiber-bonded ceramics according to the present invention is characterized in that the heat-resistant core cylinder is made of ceramics, carbon, or the fiber-bonded ceramics.

The process for producing the SiC fiber-bonded ceramics according to the present invention is characterized in that the capsule is a capsule made of Ta, and the thickness of the capsule is ⅓ to 5 times as large as the thickness of the tubular SiC fiber-bonded ceramics.

The process for producing the SiC fiber-bonded ceramics according to the present invention is characterized in that the capsule is a capsule made of glass having a softening point of 1500° C. or higher, and the thickness of the capsule is ⅓ to 5 times as large as the thickness of the tubular SiC fiber-bonded ceramics.

The process for producing the SiC fiber-bonded ceramics according to the present invention is characterized in that the SiC fiber-bonded ceramics have a tubular shape which is blocked at one end, and the heat-resistant core cylinder is removed with a portion thereof left.

Effect of the Invention

As described above, according to the process for producing SiC fiber-bonded ceramics of the present invention, it is possible to provide a process for producing SiC fiber-bonded ceramics that have similar properties to those of SiC fiber-bonded ceramics produced by hot pressing, have a shape such as an elongated shape which has been impossible to produce so far, and are dense and free of cracks or splits.

BEST MODE FOR CARRYING OUT THE INVENTION

Figure 1:
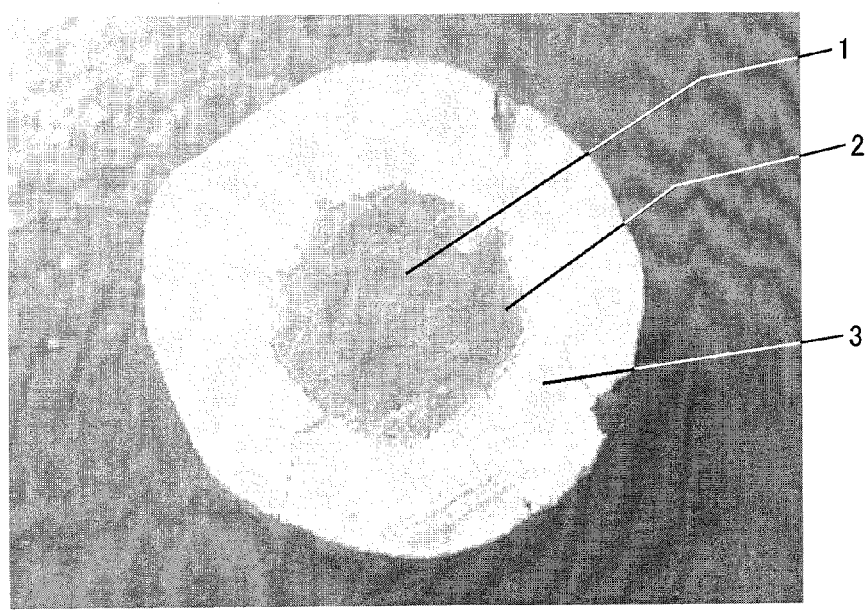
FIG. 1 is a photograph showing a cross section of SiC fiber-bonded ceramics according to the present invention which is obtained in Example 1 by hot isostatic pressing and included in a capsule.

The best mode for carrying out the production process of the present invention is constituted by the following steps and constituent materials.

Silicon carbide-based inorganic fiber, which is produced by adding a compound containing at least one or more metal element among group IIA, group IIIA, and group IIIB metal elements to polysilane or its heating reaction product, causing a heating reaction of the obtained polysilane in an inert gas to obtain a metal element-containing organosilicon polymer, and melt-spinning, curing, and firing the metal element-containing organosilicon polymer, is produced through the following four steps.

First Step

In the first step, a metal element-containing organosilicon polymer, which is a precursor polymer, is prepared. Polysilane used in the first step is a chain or cyclic polymer, which is obtained by dechlorinating one or more kinds of dichlorosilane by using sodium, according to the method described in, for example, "Chemistry of Organosilicon Compound" published by KAGAKUDOJIN (1972). The mean molecular weight of polysilane is normally 300 to 1000. This polysilane, of which general formula is shown by Chemical Formula 1, can have hydrogen atom, lower alkyl group, phenyl group, or silyl group as side chains of silicon. In any case, it is preferable that the molar ratio of carbon atoms with respect to silicon atoms be 1.5 or higher. If the molar ratio of carbon atoms with respect to silicon atoms is lower than 1.5, the carbon in the fiber together with oxygen introduced from curing is eliminated in the form of carbon dioxide gas during the process of temperature elevation up to sintering. This makes it difficult for uniform interfacial carbon layers to be formed between fiber components, which is unfavorable.

[Chemical Formula 1]

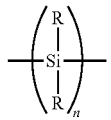

(where R is hydrogen atom, lower alkyl group, phenyl group, or silyl group)

Instead of polysilane used in the first step, a heating reaction product of polysilane may be used. The heating reaction product of polysilane contains a polysilane bond unit obtained by heating the aforementioned chain or cyclic polysilane, and an organosilicon polymer containing a carbosilane bond in part. Such an organosilicon polymer can itself be prepared by publicly-known methods. Example preparation methods include a method of causing a heating reaction of chain or cyclic polysilane at a relatively high temperature of 400 to 700° C., a method of adding phenyl group-containing polyborosiloxane to polysilane and causing a heating reaction of the resultant at a relatively low temperature of 250 to 500° C., etc. The mean molecular weight of the organosilicon polymer obtained in this way is normally 1000 to 5000.

Phenyl group-containing polyborosiloxane can be prepared according to the methods described in JPS53-42300A and JPS53-50299A. For example, phenyl group-containing polyborosiloxane can be prepared by a condensation reaction between boric acid and one or more kinds of diorganochlorosilane for removing hydrochloric acid. The mean molecular weight of phenyl group-containing polyborosiloxane is normally 500 to 10000. The amount of phenyl group-containing polyborosiloxane to be added is normally 15 parts by weight or lower with respect to 100 parts by weight of polysilane.

A compound that contains at least one or more metal element among group IIA, group IIIA, and group IIIB metal elements is added to polysilane described above or its heated product organosilicon polymer. The resulting product is reacted in an inert gas at a temperature of normally 250 to 350° C. for 1 to 10 hours. Thereby, a metal element-containing organosilicon polymer to be used as a material is prepared. The metal element described above is used at a ratio at which the content of the metal element in the SiC fiber-bonded ceramics to be obtained finally will become 0.05 to 4.0% by mass. A specific ratio can be determined arbitrarily by those skilled in the art in accordance with the teachings of the present invention. The metal element-containing organosilicon polymer is a cross-linked polymer in which at least some of silicon atoms of polysilane are linked via or not via a metal atom and an oxygen atom.

The compound to be added in the first step, which contains at least one or more metal element among group IIA, group IIIA, and group IIIB metal elements may be alkoxide, an acetylacetoxide compound, a carbonyl compound, a cyclopentadienyl compound, etc of that metal element. Specifically, the compound may be beryllium acetylacetonato, magnesium acetylacetonato, yttrium acetylacetonato, cerium acetylacetonato, boric acid butoxide, aluminum acetylacetonato, etc. Any of these compounds can produce a structure in which each of metal element is bonded with Si directly or via another element by reacting with a Si—H bond in an organosilicon polymer that is produced when the compound reacts with polysilane or its heating reaction product.

Second Step

In the second step, spun fiber is obtained by melt-spinning the metal element-containing organosilicon polymer obtained in the first step. The spun fiber can be obtained by spinning the metal element-containing organosilicon polymer, which is the precursor polymer, by a method which itself is publicly-known, such as melt-spinning, dry-spinning, etc.

Third Step

In the third step, cured fiber is prepared by heating the spun fiber obtained in the second step in an oxygen-containing atmosphere at a temperature of 50 to 170° C. The purpose of curing is to form cross-linkages of oxygen atoms between polymer molecules constituting the spun fiber to ensure that the cured fiber will not melt and adjoining fiber components will not fusion-bond in the next step of pyrolysis. The gas constituting the oxygen-containing atmosphere may be air, oxygen, and ozone. The curing time is dependent on the curing temperature, but normally several minutes to 30 hours. It is preferable to arrange that the content of oxygen in the cured fiber will be 8 to 16% by mass. A large part of this oxygen will remain in the fiber even after the next pyrolysis step to serve an important function of eliminating any excess carbon in the inorganic fiber as CO gas in the process of temperature elevation up to final sintering. If the oxygen content is less than 8% by mass, excess carbon in the inorganic fiber will remain in a more than necessary amount and become stabilized by segregating around the SiC crystal during the temperature elevation to thereby inhibit the β-SiC crystal grains from being sintered without a grain-boundary second phase therebetween. Where the oxygen content is more than 16% by mass, excess carbon in the inorganic fiber will completely be eliminated to thereby inhibit production of interfacial carbon layers between fiber components. Both of the cases are unfavorable because the mechanical properties of the material to be obtained will be damaged.

It is preferred that the cured fiber described above be further preheated in an inert atmosphere. The gas constituting the inert atmosphere may be nitrogen, argon, etc. The heating temperature is normally 150 to 800° C., and the heating time is several minutes to 20 hours. Preheating the cured fiber in an inert atmosphere can further promote the cross-linking reaction of the polymer molecules constituting the fiber while preventing oxygen inclusion into the fiber, and can thus improve the strength of the fiber while maintaining excellent elongation of the precursor polymer in the cured fiber. This makes it possible to carry out the next pyrolysis step stably and with a high work efficiency.

Fourth Step

In the fourth step, inorganic fiber is obtained by pyrolyzing the cured fiber obtained in the third step in an inert gas. The pyrolysis of the cured fiber is carried out by heating the fiber continuously or batch-wise in an inert gas atmosphere such as argon at a temperature of 1000 to 1700°.

The inorganic fiber obtained in this way is woven into a two-dimensional fabric, stacked if necessary, and cut into a predetermined shape to be made into a preform. The method of weaving the inorganic fiber includes plain weaving which repeats a complete weave pattern with two warp threads and two weft threads and passes each thread above or under one thread at time, twill weaving which repeats a complete weave pattern with three or more warp threads and three or more well threads, does not pass each thread above or under one thread at time unlike plain-weaving but passes each thread above or under more than one threads consecutively to form an oblique twill line that is drawn by points at which warp threads come above weft threads, sateen weaving which repeats a complete weave pattern with five or more warp threads and five or more well threads and forms a constantly-distanced arrangement of such points at which the threads are passed above or under only one thread, etc. Particularly, in the present invention, sateen weave which will incur little disorientation in the fiber orientation when deformed in a hot isostatic pressing process, is preferable. However, the kind of the weaving method and the orientation direction of the fiber are to be arbitrarily selected in accordance with the properties required of an intended shape, and hence not limited to those above, and various kinds of weaving methods may be combined. It is also possible to produce a tubular SiC fiber-bonded ceramics by winding the inorganic fiber fabric around a heat-resistant core cylinder to form a tubular preform and removing the core cylinder after hot isostatic pressing. When winding the inorganic fiber fabric around a heat-resistant core cylinder, it is required to wind it densely by using an organic adhesive. Here, as the case may be, it is possible to block one end of the tubular SiC fiber-bonded ceramic by winding the fiber fabric around the heat-resistant core cylinder so as to wrap around one end of the heat-resistant core cylinder.

The heat-resistant core cylinder is made of at least one of ceramics, carbon, and fiber-bonded ceramics. Ceramics may be silicon carbide, alumina, mullite, and silicon nitride, but preferably silicon carbide ceramics having a similar coefficient of thermal expansion to that of SiC fiber-bonded ceramics should be used. If the coefficient of thermal expansion of the heat-resistant core cylinder is smaller than that of the SiC fiber-bonded ceramics, a tensile stress will be generated to the SiC fiber-bonded ceramics during a cooling process after press forming. On the other hand, if the coefficient of thermal expansion of the heat-resistant core cylinder is larger than that of the SiC fiber-bonded ceramics, a compression stress will be generated to the SiC fiber-bonded ceramics during the cooling process after press forming. In the case of carbon, if a porous one is used, the heat-resistant core cylinder will deform being unable to endure the isostatic pressing force during the press forming and will not be able to form a shape having the intended size. Therefore, a preferable carbon is a dense one which will not be deformed by the pressure during the press forming, is produced by CIP method, and has a compressive strength of 100 MPa or higher. For example, a preferable carbon may be ISO-63, ISO-66, ISO-68, and ISO-88 provided by Toyo Tanso Co., Ltd., etc.

The fiber-bonded ceramic to be used as the heat-resistant core cylinder may be (A) (i) inorganic fiber made of (a) and/or (b) where (a) is an amorphous material made of Si, M, C, and O (where M is Ti or Zr) and (b) is an aggregate of (1) crystalline fine particle of β-SiC, MC, and C or (2) an amorphous $SiO_2$ and $MO_2$, (ii) an inorganic material which is to fill the gaps in the inorganic fiber, is made of (c) and/or (d), and in some case has (e) dispersed therein where (c) is an amorphous material made of Si and O, and in some case M, (d) is a crystalline material made of crystalline $SiO_2$ and $MO_2$, and (e) a crystalline particulate inorganic material made of MC having a particle size of 100 nm or smaller, and (iii) inorganic fiber-bonded ceramics which are to be formed on the surface of the inorganic fiber, are mainly made of C, have in some case MC crystalline particle having a particle size of 100 nm or smaller dispersed therein, and include interfacial layers of 1 to 100 nm, or SiC fiber-bonded ceramics made of inorganic fiber having a sintered structure of SiC wherein the inorganic fiber containing 0.01 to 1% by mass of 0 and at least one kind of metal atoms selected from a group consisting of group IIA, group IIIA, and group IIIB metal atoms is bonded in a manner to faun a structure that is very similar to the closest-packed structure, and interfacial layers of 1 to 100 nm mainly made of C are formed between the fiber components. SiC fiber-bonded ceramics having the same coefficient of thermal expansion are more preferable. The former is the material disclosed in, for example, JPH7-69747A, and the latter is the material disclosed in, for example, JPH11-92227.

The method for blocking one end of a tubular shape may be leaving a portion of the heat-resistant core cylinder in the product. In this case, a heat-resistant core cylinder is made by pasting SiC fiber-bonded ceramics and carbon together, and only the carbon portion of the heat-resistant core cylinder is removed after the press forming, which enables the tubular shape to be blocked at one end with the SiC fiber-bonded ceramics which are the same material as the tubular shape. The method for removing only the carbon portion of the heat-resistant core cylinder may be, for example, machining, or oxidizing the carbon in an oxidizing atmosphere. It is unfavorable to do this by using a heat-resistant core cylinder made of only SiC fiber-bonded ceramics, because SiC fiber-bonded ceramics are materials hard to machine and the machining cost for machining the materials into a tubular shape will run up.

Next, the obtained preform is heated in a range of 1200° C. to 1800° C. or more preferably 1500° C. to 1700° C. in vacuum, or an inert gas atmosphere, or a reducing gas atmosphere to adjust the oxygen content in the inorganic fiber to 6.0% by mass or lower, or more preferably to 1.0 to 5.5% by mass, and to adjust the ratio of the number of carbon atoms with respect to the number of silicon atoms (number of C atoms/number of Si atoms) in the preform to 1.02 to 1.20, or more preferably to 1.07 to 1.18. An argon atmosphere is preferable as the inert atmosphere, and a carbon monoxide atmosphere is preferable as the reducing atmosphere. The heating temperature and time for adjusting the oxygen content in the fiber to 6.0% by mass or lower and adjusting the ratio of the number of carbon atoms to the number of silicon atoms (number of C atoms/number of Si atoms) in the preform to 1.02 to 1.20 are selected in the range of 1200° to 1800° C. The number of C atoms/number of Si atoms can be adjusted based on the heating temperature and the atmosphere. For example, when the number of C atoms/number of Si atoms is going to be lower than 1.02, the heating temperature is set to near the upper limit of 1800° C. in order to increase SiO to be emitted from the fiber. Alternatively, a carbon monoxide atmosphere is selected to suppress emission of CO, which enables to increase the number of C atoms/number of Si atoms. When the number of C atoms/number of Si atoms is going to be higher than 1.20, the heating temperature is set to near the lower limit of 1200° C. in an argon atmosphere to reduce SiO to be emitted from the fiber and while increasing CO emission, which enables to reduce the number of C atoms/number of Si atoms. If the oxygen content in the fiber becomes higher than 6.0% by mass, a gas will be emitted from the preform in a capsule during the hot isostatic pressing process and break the capsule or inhibit the SiC fiber-bonded ceramics from becoming dense. If the ratio of the number of carbon atoms to the number of silicon atoms (number of C atoms/number of Si atoms) in the preform becomes lower than 1.02, uniform interfacial carbon layers will not be produced between SiC fiber components constituting the SiC fiber-bonded ceramics. This will inhibit crack deflection in the interfacial carbon layers during the fracture process, leading to reduction of the fracture toughness of the SiC fiber-bonded ceramics. If the ratio of the number of carbon atoms to the number of silicon atoms (number of C atoms/number of Si atoms) in the preform becomes higher than 1.20, sintering between β-SiC crystal grains constituting the SiC fiber will be inhibited by carbon, leading to reduction of the mechanical properties of the SiC fiber. It is possible to measure the oxygen content and the carbon content by placing several grams of the same fabric as that of the preform as an indicator in a heating furnace when heating the preform, and analyzing the indicator by LECO after the heating process. Further, it is preferable to predict the heating temperature and keeping time by heating only the indicator beforehand. In order to improve smooth releasing of the preform from the capsule after the press forming, it is advisable to wind a sheet having excellent releasing property such as carbon around the outer circumference of the preform before the heating. If such a sheet might influence uniform control of oxygen during the heating, the sheet needs not necessarily be wound around the outer circumference of the preform but may be pasted onto the inner surface of the capsule, or BN or the like may be sprayed. However, in this case, any organic component contained in the sheet or the spray has to be removed completely by a thermal treatment, etc.

Next, the heating process is finished, and the preform, of which oxygen content has been adjusted, is inserted into a capsule. Here, it is possible to adjust the oxygen content in the fiber by carrying out the heating process after inserting the preform into the capsule. However, if possible, it is preferable to insert the preform into the capsule after the heating process, because otherwise the preform might result in having non-uniform oxygen contents from the end portions to the middle portion depending on the shape of the preform such as an elongated shape. The capsule is made of Ta, and has a thickness of ⅓ to 5 times or more preferably about ½ to 2 times as large as the thickness of the tubular SiC fiber-bonded ceramics. Alternatively, the capsule is made of glass having a softening point of 1500° C. or higher, and has a thickness of ⅓ to 5 times or more preferably about ½ to 2 times as large as the thickness of the tubular SiC fiber-bonded ceramics. Welding by electron beam, etc. is effective for vacuum sealing of a Ta capsule, while a method of melting the glass by acetylene gas burner, etc. is effective for vacuum sealing of a glass capsule. Here, regardless of which material the capsule is made, it is important that the thickness of the capsule is ⅓ to 5 times as large as the average thickness of the tubular SiC fiber-bonded ceramics obtained after the hot isostatic pressing process, after which the ceramics will have become dense. If the thickness of the capsule is smaller than the above, a deformation of the preform (or densification of the fiber) might break the capsule or mix the capsule into the fiber leaving the capsule in the product. If the thickness of the capsule is larger than the above, a difference in thermal expansion between the capsule and the SiC fiber-bonded ceramics after the press forming might place an excessive load on the SiC fiber-bonded ceramics. As a method for adjusting the thickness of the capsule, capsules may be overlaid doubly or triply, if it is hard to obtain the intended thickness by only one capsule. Furthermore, in order to facilitate releasing of the capsule, other than the release sheet and the spray described above, a method of overlaying capsules made of materials having different coefficients of thermal expansion to utilize a mismatch in thermal expansion and thermal contraction is effective, unless such a mismatch deteriorates the properties of the SiC fiber-bonded ceramics.

Then, the capsule into which the preform has been vacuum-sealed is subjected to hot isostatic pressing at a temperature of 1800 to 2000° C. and at a pressure of 9.8 to 196 MPa. In the case of a Ta capsule, it is necessary to pay attention to a reaction between a vessel into which the capsule is inserted and the capsule. In the case of a glass capsule, since the capsule will melt at a high temperature, the glass capsule is put in a vessel made of carbon or the like so that molten glass may not flow out. At this time, it is necessary to insert inorganic powder between the carbon vessel and the glass capsule so that when the glass capsule melts, the preform may not be bared from the molten glass. In the process using the glass capsule, it is necessary to pay careful attention so as not to break the glass capsule when introducing a process gas (for example, an argon gas). After this, a SiC fiber-bonded ceramics can be obtained by removing the capsule. When the preform is tubular and formed around a core cylinder, tubular SiC fiber-bonded ceramics can be obtained by removing the core cylinder together with the capsule. As the case may be, it is also possible to produce a tubular shape of which one end is blocked, by leaving a portion of the heat-resistant core cylinder. For example, when the heat-resistant core cylinder is made of the fiber-bonded ceramics and ceramics or carbon, leaving the SiC fiber-bonded ceramics portion of the heat-resistant core cylinder will result in a tubular shape of which one end is blocked by the same material.

EXAMPLES

The process for producing SiC fiber-bonded ceramics according to the present invention will now be explained in further detail by presenting examples and comparative examples. However, the present invention is not limited to the examples to be described below, but can be embodied in a different form without departing from the idea of the present invention. Note that major conditions and results of the examples and comparative examples are shown in Table 1.

Example 1

Example 1 of the process for producing SiC fiber-bonded ceramics according to the present invention will be explained. First, inorganic fiber was prepared in the following procedure. Anhydrous xylene containing 400 g of sodium was heated and refluxed under a nitrogen gas flow while 1 L of dimethyldichlorosilane was dropped thereinto, and then the anhydrous xylene was continuously heated and refluxed for 10 hours, resulting in production of a precipitate. The precipitate was filtered and cleaned with methanol and then water, resulting in 420 g of white polydimethylsilane. The general formula of the polydimethylsilane is shown by Chemical Formula 2. As apparent from Chemical Formula 2, the number of atoms ratio Si:C in the obtained polydimethylsilane was 1:2, and hence the molar ratio of carbon atoms with respect to silicon atoms was 1.5 or higher. Next, under a nitrogen gas atmosphere, 750 g of diphenyldichlorosilane and 124 g of boric acid were heated in n-butylether at 100 to 120° C., resulting in a white resinoid, which was then further heated in vacuum at 400° C. for 1 hour, resulting in 530 g of phenyl group-containing polyborosiloxane. Four parts by weight of the phenyl group-containing polyborosiloxane was added to 100 parts by weight of the obtained polydimethylsilane, and the resultant was thermally condensed at 350° C. for 5 hours, resulting in an organosilicon polymer having a large molecular weight. Seven parts by weight of aluminum-tri-(sec-butoxido) was added to a xylene solution in which 100 parts by weight of the organosilicon polymer was dissolved, and the resultant was let to cause a cross-linking reaction at 310° C. under a nitrogen gas flow, resulting in synthesis of polyaluminocarbosilane.

[Chemical Formula 2]

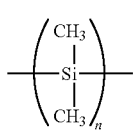

The obtained polyaluminocarbosilane was melt-spun at 245° C. and heated at 140° C. in the air for 5 hours, and after this heated at 300° C. in nitrogen for 10 hours, resulting in cured fiber. Then, the cured fiber was continuously fired at 1500° C. in nitrogen, resulting in synthesis of silicon carbide-based continuous inorganic fiber.

Then, the obtained silicon carbide-based continuous inorganic fiber was woven into a sateen-woven sheet, which was then cut into pieces having a length of 200 mm and a width of 250 mm. The cut sheet was wound around a carbon core having a diameter of 8 mm and a length of 250 mm and bounded by an organic binder, resulting in a tubular preform having an outer diameter of 18 mm and a length of 250 mm.

Next, the preform was heated at 1600° C. under an argon atmosphere of $1.1 \times 10^5$ Pa for 1 hour to adjust the oxygen content in the fiber. After the heating process, a fiber cutoff put under the same atmosphere was analyzed in terms of oxygen content, which turned out to be 4.5% by mass. After the heating process, it turned out that the organic binder had decomposed and the preform had become slightly larger in outer diameter than before the heating process. However, the preform was substantially kept in its shape before the heating process, and had no trouble being inserted into a capsule.

Then, the preform was inserted into a Ta capsule having an outer diameter of 28 mm, a length of 260 mm, and a thickness of 4 mm, and the capsule was vacuum-sealed with caps made of Ta, which were welded to its both ends by electron beam. Judging from a fact to be described later that the tubular SiC fiber-bonded ceramics finally obtained had an average thickness of about 2.3 mm, the thickness of this Ta capsule was about 1.74 times as large as the thickness of the tubular SiC fiber-bonded ceramics. Then, the capsule was set in a hot isostatic pressing apparatus and processed at a temperature of 1900° C. and at a pressure of 49 MPa. The program was set such that the pressing should be started when the temperature became 1500° C. and the pressure should reach the set value at the same time as the temperature reached 1900° C. The keeping time at 1900° C. was 1 hour.

Figure 2:
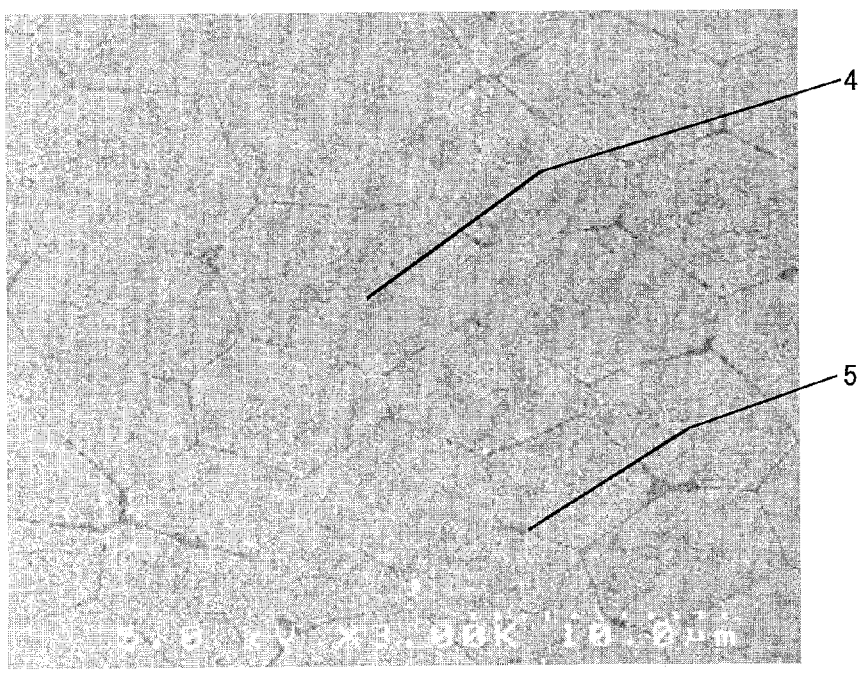
FIG. 2 is a FE-SEM photograph showing a cross section of SiC fiber-bonded ceramics according to the present invention obtained in Example 1, where the cross section is polished.

Next, the capsule after the press forming was cut at an end and polished, and the cross-sectional structure of the capsule was observed by a scanning electron microscope (FE-SEM). FIG. 1 shows the cross section and FIG. 2 shows the result of observation by the FE-SEM. Cracks were found in the processed Ta vessel, while no cracks were found in the obtained tubular SiC fiber-bonded ceramics, of which average thickness was about 2.3 mm. The density of the SiC fiber-bonded ceramics was measured by Archimedes method and found to be 3.10 g/cm³. Judging from a fact that the density of completely-densified void-less SiC fiber-bonded ceramics produced by hot press forming is 3.07 to 3.12, the density of the compact obtained in Example 1 fell within this range, justifying to say that the compact was completely densified. Further, as shown in FIG. 2, neither voids nor cracks were found even by microscopic observation, and the compact was composed of the fiber having transformed into a sintered structure of SiC having a substantially hexagonal columnar shape, which are the standard structure of SiC fiber-bonded ceramics, and interfacial carbon layers covering the circumference of the fiber. Next, the portion of the capsule that was left was machined, and tubular SiC fiber-bonded ceramics having an outer diameter of 11 mm, a length of 180 mm, and a thickness of 1 mm were obtained.

Example 2

Example 2 of the process for producing SiC fiber-bonded ceramics according to the present invention will be explained. First, preforms were prepared according to the same procedure as that of Example 1, and heated for 1 hour with the atmospheres and the temperatures set as shown in Table 1. The results of oxygen analysis conducted after the heating process on fiber cutoffs put under the same atmospheres are likewise shown in Table 1.

TABLE 1

| | atmosphere | temperature (° C.) | capsule material | thickness ratio between capsule & material | oxygen content after process (pts · mass) | number of atoms ratio between C & Si after process | density after press forming (g/cm³) | densification state | carbon layer production state | overall judgment |
|---|---|---|---|---|---|---|---|---|---|---|
| example 1 | argon | 1600 | Ta | 1.74 | 4.5 | C/Si = 1.08 | 3.10 | densified | uniform | o |
| example 2 | carbon monoxide | 1500 | fused silica glass | 1.30 | 5.3 | C/Si = 1.18 | 3.08 | densified | uniform | o |
| | argon | 1600 | fused silica glass | | 4.0 | C/Si = 1.07 | 3.10 | densified | uniform | o |
| | argon | 1750 | fused silica glass | | 0.8 | C/Si = 1.06 | 3.11 | densified | uniform | o |
| comparative example 1 | argon | 1100 | fused silica glass | | 13.0 | C/Si = 1.25 | unmeasurable due to water infiltration | not densified | unknown | x |

TABLE 1-continued

| | atmosphere | temperature (° C.) | capsule material | thickness ratio between capsule & material | oxygen content after process (pts · mass) | number of atoms ratio between C & Si after process | density after press forming (g/cm³) | densification state | carbon layer production state | overall judgment |
|---|---|---|---|---|---|---|---|---|---|---|
| comparative example 2 | argon | 1850 | fused silica glass | | 0.4 | C/Si = 1.01 | 3.12 | densified | non-uniform | x |

*cf.) density of completely densified SiC fiber-bonded ceramics produced by hot pressing: 3.07 to 3.12 g/cm³

Then, these preforms were inserted into fused silica ampoules having an outer diameter of 23 mm, a length of 260 mm, and a thickness of 1.5 mm (capsules sealed at one end, having a softening point of 1720° C.) respectively, and further inserted into fused silica ampoules having an outer diameter of 27 mm, a length of 260 mm, and a thickness of 1.5 mm respectively, such that the capsule thickness became 3 mm. Since the preforms were prepared in the same procedure as used in Example 1, the average thickness of the tubular SiC fiber-bonded ceramics obtained in Example 2 was about 2.3 mm. Therefore, the thickness of the fused silica capsules, which was 3 mm, was about 1.3 times as large as the thickness of the tubular SiC fiber-bonded ceramics. Then, while being vacuumed, the capsules were vacuum-sealed by the ends thereof being melted by acetylene burner. Next, these capsules were buried in BN powder filled in carbon vessels respectively, and subjected to hot isostatic pressing at a temperature of 1900° C. and at a pressure of 49 MPa. The program was set such that the pressing should be started when the temperature became 1500° C. and the pressure should reach the set value at the same time as the temperature reached 1900° C. The keeping time at 1900° C. was 1 hour. In order to prevent the glass capsules from being broken due to strain during cooling, glass strain was removed by keeping the capsules for 1 hour at 1200° C. which was slightly higher than the glass strain point.

Then, as in Example 1, the capsules after the press forming were cut at an end and polished, and the cross-sectional structures of the capsules were observed by a scanning electron microscope (FE-SEM). No cracks were found in the obtained tubular SiC fiber-bonded ceramics. The density of the SiC fiber-bonded ceramics measured in the same manner as in Example 1 is shown in Table 1. The density of any of them was substantially equal to the density of SiC fiber-bonded ceramics produced by hot pressing, and hence SiC fiber-bonded ceramics sufficiently densified were obtained. The structures of the SiC fiber-bonded ceramics were substantially the same as the structure of the SiC fiber-bonded ceramics observed in Example 1. Next, the portion of the capsules that was left was machined, and tubular SiC fiber-bonded ceramics having an outer diameter of 11 mm, a length of 180 mm, and a thickness of 1 mm were obtained.

Comparative Example 1

Comparative Example 1 implemented in order to confirm the effect of Examples of the process for producing SiC fiber-bonded ceramics according to the present invention will be explained. First, a preform was prepared according to the same procedure as that of Example 1, and heated at 1100° C. in an argon atmosphere for 1 hour. After the heating process, a fiber cutoff put under the same atmosphere was analyzed in terms of oxygen content, which turned out to be 13.0% by mass.

Then, as in Example 2, the preform was inserted into a fused silica ampoule having an outer diameter of 23 mm, a length of 260 mm, and a thickness of 1.5 mm (a capsule sealed at one end, having a softening point of 1720° C.), and further inserted into a fused silica ampoule having an outer diameter of 27 mm, a length of 260 m, and a thickness of 1.5 mm, such that the capsule thickness became 3 mm. Then, while being vacuumed, the capsule was vacuum-sealed by the end thereof being melted by acetylene burner. Next, the capsule was buried in BN powder filled in a carbon vessel, and subjected to hot isostatic pressing at a temperature of 1900° C. and at a pressure of 49 MPa.

Figure 3:
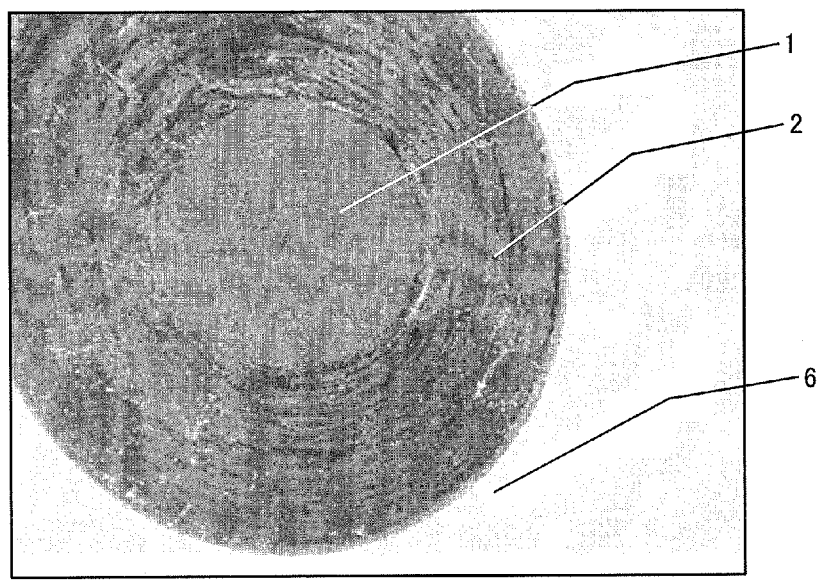
FIG. 3 is a photograph showing a cross section of SiC fiber-bonded ceramics which are obtained in Comparative Example 1 by hot isostatic pressing and included in a capsule.

Then, as in Example 2, the capsule after the hot isostatic pressing was cut at an end. The result of observing the condition of the compact is shown in FIG. 3. In this condition, the cooling liquid that was poured when cross-sectionally cutting the capsule was leaking out from the compact, which was hence not densified at all, not being in a state allowing its cross section to be polished to enable observation of the structure. Density measurement by Archimedes method could not be conducted either, because water infiltration was heavy.

Comparative Example 2

Comparative Example 2 implemented in order to confirm the effect of Examples of the process for producing SiC fiber-bonded ceramics according to the present invention will be explained. First, a preform was prepared in accordance with the same procedure as that of Example 1, and heated at 1850° C. in an argon atmosphere for 1 hour. After the heating process, a fiber cutoff put under the same atmosphere was analyzed in terms of oxygen content, which turned out to be 0.4% by mass. The number of C atoms/number of Si atoms ratio was 1.01.

Then, as in Example 2, the preform was inserted into a fused silica ampoule having an outer diameter of 23 mm, a length of 260 mm, and a thickness of 1.5 mm (a capsule sealed at one end, having a softening point of 1720° C.), and further inserted into a fused silica ampoule having an outer diameter of 27 mm, a length of 260 mm, and a thickness of 1.5 mm, such that the capsule thickness became 3 mm. Then, while being vacuumed, the capsule was vacuum-sealed by the end thereof being melted by acetylene burner. Next, the capsule was buried in BN powder filled in a carbon vessel, and subjected to hot isostatic pressing at a temperature of 1900° C. and at a pressure of 49 MPa.

Figure 4:
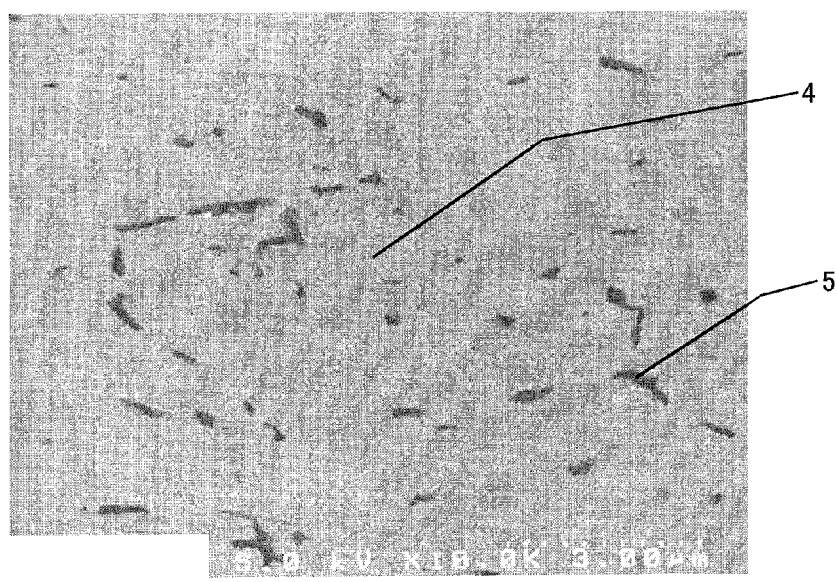
FIG. 4 is a FE-SEM photograph showing a cross section of SiC fiber-bonded ceramics obtained in Comparative Example 2, where the cross section is polished.

Then, as in Example 1, the capsule after the press forming was cut at an end and polished, and the cross-sectional structure of the capsule was observed by a scanning electron microscope (FE-SEM). FIG. 4 shows the result of observation by the FE-SEM. The material fiber having a circular cylindrical shape was densified well having transformed into a substantially hexagonal columnar shape, but carbon layers existing between densified fiber components were extremely non-uniform. Since the carbon layers between fiber components function to suppress crack propagation, what is meant by the carbon layers being non-uniform is that crack propagation cannot be suppressed, i.e., fracture toughness is significantly low.

The material obtained in Comparative Example 2, in which carbon layers were not produced uniformly between fiber components unlike in SIC fiber-bonded ceramics, is a brittle material which cannot suppress propagation of a crack that may occur at the beginning of fracture.

Description of Reference Numerals

1 carbon core
2 SiC fiber-bonded ceramics portion
3 Ta vessel
4 SiC fiber constituting SiC fiber-bonded ceramics
5 carbon layer produced at an interface between SiC fiber components constituting SiC fiber-bonded ceramics
6 glass

The invention claimed is:

1. A process for producing SiC fiber-bonded ceramics composed of: inorganic fiber made of SiC; and interfacial layers mainly made of carbon, comprising:
   a step of adding a compound containing at least one or more metal element among group IIA, group IIIA, and group IIIB metal elements to polysilane or a heating reaction product of the polysilane to form a resulting product and then heat-reacting the resulting product in an inert gas to obtain a metal element-containing organosilicon polymer;
   a step of melt-spinning, curing, and firing the metal element-containing organosilicon polymer to produce silicon carbide-based inorganic fiber;
   a step of forming the silicon carbide-based inorganic fiber into a certain shape to obtain a preform; and
   a step of vacuum-sealing the preform into a capsule and hot-isostatic-pressing the preform to obtain SiC fiber-bonded ceramics,
   wherein a ratio of a number of carbon atoms to a number of silicon atoms (number of C atoms/number of Si atoms) in the preform is 1.02 to 1.20, and before the hot isostatic pressing, the preform is heated in an inert gas atmosphere or a reducing gas atmosphere at a temperature of 1200° C. to 1800° C. to adjust oxygen content in the inorganic fiber to 6.0% by mass or lower, and then the hot isostatic pressing is carried out.

2. The process for producing the SiC fiber-bonded ceramics according to claim 1, wherein the SiC fiber-bonded ceramics are tubular, and the preform is formed by winding a fabric sheet around a heat-resistant core cylinder, the fabric sheet being obtained by weaving the silicon carbide-based inorganic fiber.

3. The process for producing the SiC fiber-bonded ceramics according to claim 2, wherein the heat-resistant core cylinder is made of ceramics, carbon, or fiber-bonded ceramics.

4. The process for producing the SiC fiber-bonded ceramics according to claim 2, wherein the capsule is a capsule made of Ta, and a thickness of the capsule is ⅓ to 5 times as large as a thickness of the tubular SiC fiber-bonded ceramics.

5. The process for producing the SiC fiber-bonded ceramics according to claim 2, wherein the capsule is a capsule made of glass having a softening point of 1500° C. or higher, and a thickness of the capsule is ⅓ to 5 times as large as a thickness of the tubular SiC fiber-bonded ceramics.

6. The process for producing the SiC fiber-bonded ceramics according to claim 2, wherein the SiC fiber-bonded ceramics has a tubular shape which is blocked at one end, and the heat-resistant core cylinder is removed with a portion thereof left.

* * * * *